Oct. 31, 1933.  E. P. JAGGARD  1,932,897
MATERIAL HANDLING APPARATUS
Filed Sept. 2, 1932   3 Sheets-Sheet 1

E. P. Jaggard  Inventor

By  Attorneys.

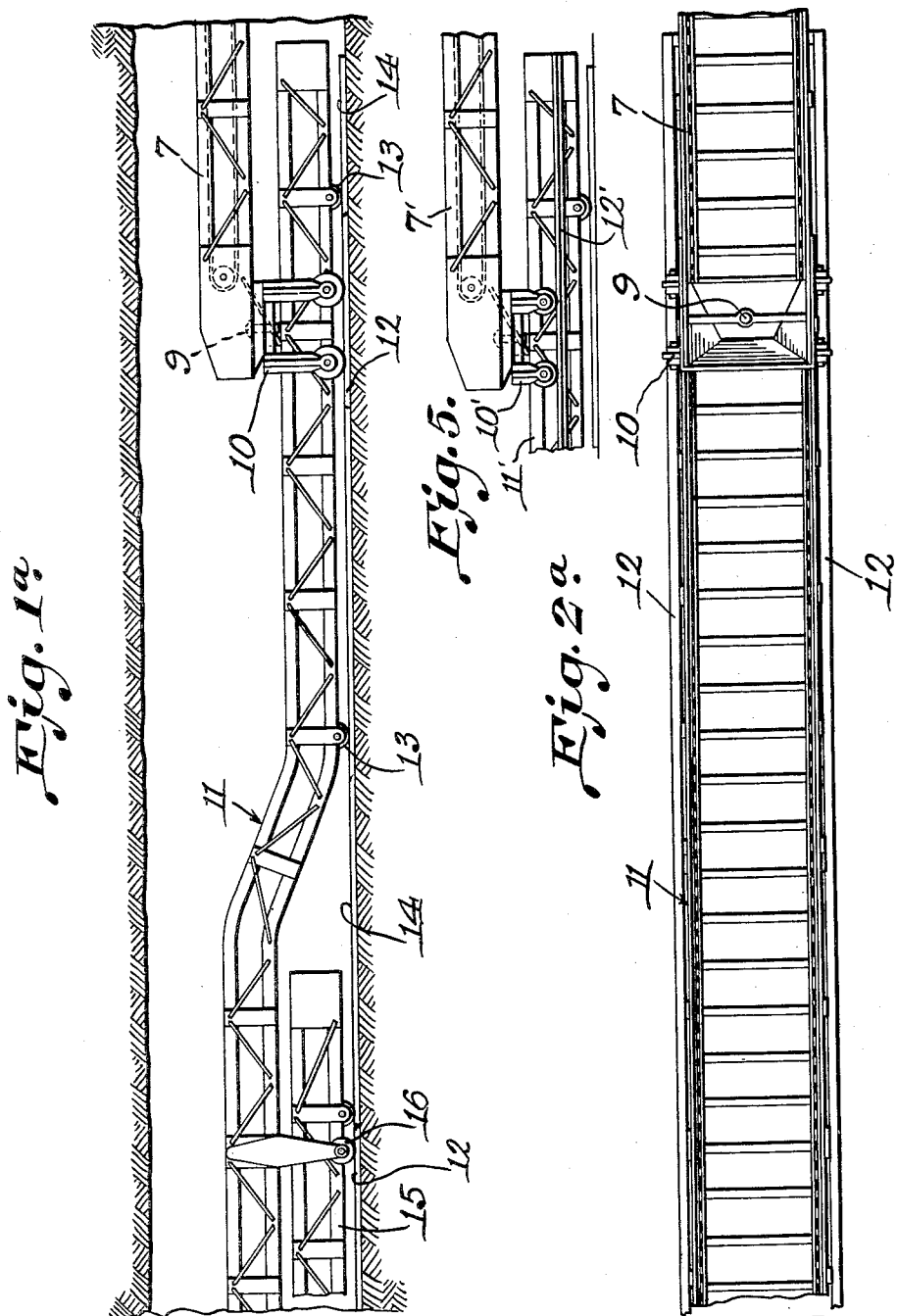

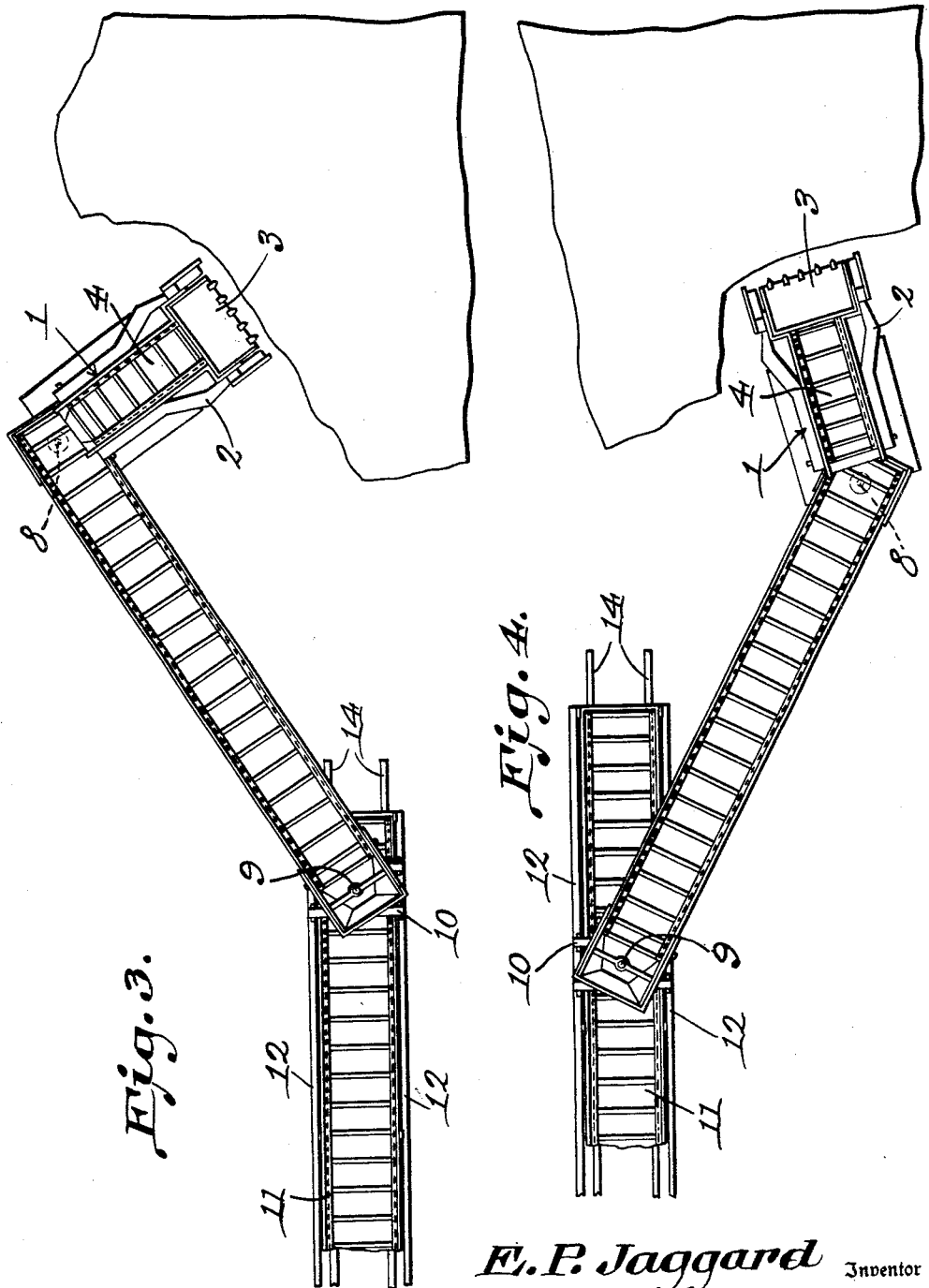

Patented Oct. 31, 1933

1,932,897

UNITED STATES PATENT OFFICE 1,932,897

MATERIAL HANDLING APPARATUS

Ernest P. Jaggard, Frankstown Township, Blair County, Pa., assignor to Albertine M. Hughes, Logan Township, Pa.

Application September 2, 1932. Serial No. 631,566

15 Claims. (Cl. 198—7)

This invention relates to material handling apparatus and more especially to an articulated arrangement of loading and conveying mechanisms whereby the loading portion can be moved to any desired position without disturbing the operative relation of the conveyor sections but on the contrary, maintaining an unbroken conveying system extending from the loader which is located at the material to be handled, to the point of delivery of the material from the apparatus.

Heretofore the use of a movable loading apparatus in connection with a section conveying system has been objectionable because considerable labor and time have necessarily been consumed in taking apart the sections, readjusting them, and/or inserting or removing sections. An object of the present invention is to provide an apparatus which, after being set up, can be used indefinitely without being taken apart for readjustment, this being due to the fact that the apparatus is articulated to permit any desired movement of the loading section relative to the associated conveyor sections without interfering with their proper cooperation and because of the superposed relative positions of the conveyors.

A still further object is to provide a material handling apparatus having a conveyor system capable of extension as the working face advances, without breaking the conveyors to insert an additional section of frame and additional lengths of belt or conveying chain, the delivery end of the apparatus remaining stationary while the loading mechanism at the other end is free to move in any direction relative to the conveyor onto which it is directing material.

With the foregoing and other objects in view which will appear as the description proceeds the invention resides in certain novel arrangements of parts hereinafter more fully described and pointed out in the claims it being understood that various changes may be made in the construction and arrangement of the parts without departing from the spirit of the invention as claimed.

In the accompanying drawings the preferred form of the invention has been shown.

In said drawings

Figure 1a is a side elevation of the rear portion thereof.

Figure 2a is a plan view of the portion shown in Figure 1a.

Figure 3 is a plan view illustrating in diagram in one position to which they can be moved.

Figure 4 is a similar view showing the parts in another position.

Figure 5 is a side view of a slightly modified arrangement.

Referring to the figures by characters of reference, 1 designates a loading apparatus of any desired construction consisting primarily of a self propelled mechanism which elevates material to a height sufficient to allow its discharge upon a conveyor. For example it can consist of a boom 2 carrying a scoop 3 adapted to be operated by any suitable mechanism so that after the scoop has been lowered, and filled by advancing the apparatus toward a pile of bulk material, said scoop can be swung upwardly so as to deliver the gathered material onto a conveyor 4. A mechanism of this type has been disclosed for example, in the copending application filed January 29, 1932, Serial Number 589,699, by C. R. Hughes, patented June 20, 1933, No. 1,915,021. This mechanism in itself constitutes no part of the present invention because it is to be understood that any means for picking up or gathering the material and delivering it from the loading apparatus can be used.

The loader is movably mounted preferably on belt wheels or supports 5 whereby it is possible to advance and retract the loader, turn it, and move it at any angle desired relative to the pile of bulk material or to the working face of the room. It is not new to mount a machine so as to be capable of such manipulation and, therefore, it is not deemed necessary to show or describe mechanism for that purpose. It should be sufficient to state that the loading mechanism is free to travel in any direction relative to the mass of material to be handled and will elevate the material sufficiently to allow its discharge upon a floating conveyor hereinafter described.

Figure 1:
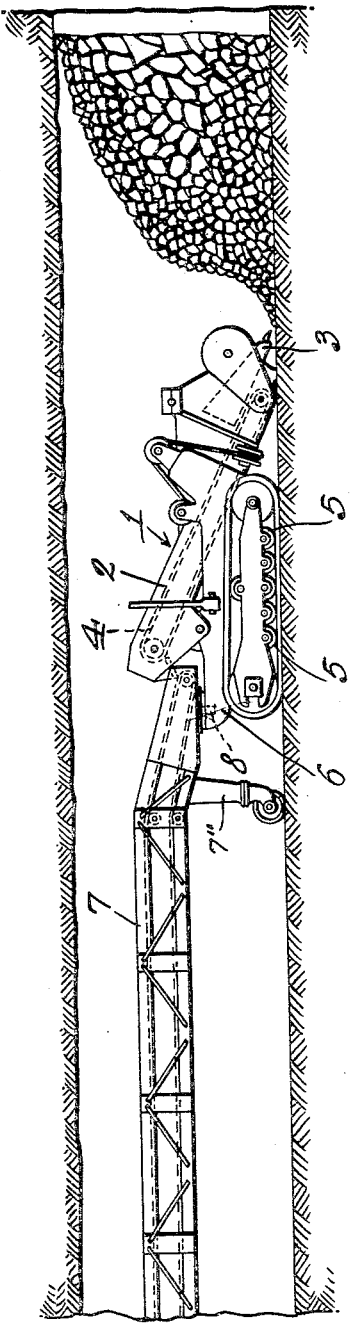
Figure 1 is a side elevation of the front end portion of the handling apparatus.
Figure 2:
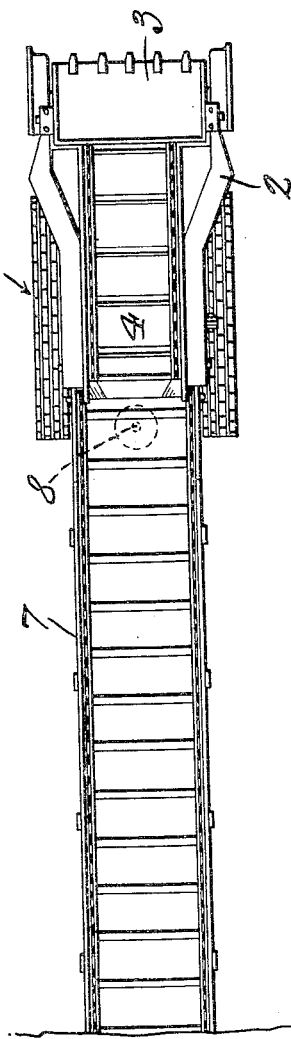
Figure 2 is a plan view of the portion shown in Figure 1.

The loading apparatus is provided at its rear end with an extension or bracket 6 to which is connected the front end portion of a floating conveyor section 7. A swivel 8 connects the front end of this section detachably and pivotally to the loading apparatus. An alternate arrangement is to have the fore end of the floating conveyor mounted upon, hung from or supported by the loading machine, its frame or anything attached to it in such a way that the attachment derives its motion from the loading machine and moves in consort with the loading machine. Under some conditions, and as illustrated in Figure 1, the front end of section 7 can be mounted on a wheeled support 7'' or the like. The rear end of section 7 which may have a delivery hopper or the like, is pivotally supported at 9 by a carriage 10. This carriage straddles and is mounted to travel longitudinally along a main conveyor section 11, it being understood that suitable means, such as rails 12, can be provided for the carriage.

Conveyor section 11 is supported for movement by wheels 13 or the like which can be mounted on rails 14, the floor, or any other suitable supporting means or the conveyor can lie flat on the floor. This section 11 preferably is raised at its discharge end so as to lap and deliver material onto another main section 15 similarly mounted and constructed. Where section 11 laps section 15 it straddles the same and can be supported by wheels 16 engaging the rails 12, the floor or any other support provided. Thus the two main sections are free to move longitudinally relative to each other and as any desired number and length of sections like the sections 11 and 15 can be used, the conveyor can be made of a desired length to extend from the point of loading to the point or points of delivery.

The loading apparatus includes propelling mechanism so that said apparatus thus constitutes the means for moving conveyor 7 only. The other conveyors are separate and distinct and in no way connected either for driving the conveyor belts, aprons, or the like or for propelling the conveyor sections.

The feature of primary importance is the floating conveyor section 7 swiveled at both ends and movable at its discharge end longitudinally of the section 11. This section 7 is always in a position to deliver material to section 11, irrespective of their angles to each other, and at various points upon conveyor 11 while conveyor 7 may be in motion relative to it either longitudinally or laterally. As a result of this arrangement the loading apparatus 1 can be moved forwardly or backwardly, moving section 7 therewith. It can also be moved laterally to any angle relative to section 11 and the section 7 will continue to maintain a conveyor connection between the loader and the section 11. Thus the loading apparatus can be manipulated to bring it to the most advantageous positions but at all times the means for conveying material therefrom to the sections 11 and 15 will be maintained unbroken.

It is to be understood that all of the sections 7, 11 and 15 of the conveyor have their own independent aprons, belts, chains or other carriers so that relative movement of the sections will not interfere with their proper functioning.

By utilizing an articulated extensible conveyor having a floating section pivotally connected to and interposed between the loading apparatus and the point of delivery, the apparatus is capable of unrestrained use, can be elongated or contracted as found necessary and the conveyor 7 can be angled laterally to compensate for side motions of the loading apparatus, thereby effecting a considerable saving of time and labor which otherwise would be expended in setting up, assembling and adjusting the parts as the work advances.

While the carriage 10 has been shown straddling section 11 and mounted to travel on rails 12 or the like, it may be desirable, under some conditions to mount the carriage on the section 11 so as to move longitudinally therealong.

In Figure 5 the carriage 10' on which the floating conveyor 7' is swiveled is mounted to travel on rails 12' carried by the conveyor section 11'. This is a modified arrangement which might be used under some conditions.

Although two main conveyor sections have been shown, one overlapping the other, it is to be understood that under some conditions a single main conveyor section can be used. Also, if desired, the main conveyor sections can be arranged side by side in lapping relation instead of overlying, the material being transferred laterally from the raised end of one onto the lower end of the other.

What is claimed is:

1. Material handling apparatus including a loading apparatus, and an extensible articulated conveyor detachably and movably connected thereto for receiving material therefrom, said conveyor being swivelly connected to the loader.

2. Material handling apparatus including a main conveyor, a movable loading apparatus having gathering and elevating means, a floating conveyor movably and detachably and swivelly joined to the loading apparatus for receiving material therefrom and shiftable at its other end relative to the main conveyor for delivering material thereto at any point therealong.

3. Material handling apparatus including a main conveyor section mounted for longitudinal movement, a movable loading apparatus constituting a draft device movable laterally and longitudinally relative to said main conveyor section, and a floating conveyor section movably mounted relative to said main section and swivelly and detachably joined to the loading apparatus for conducting material therebetween irrespective of their relative angular positions, said floating conveyor being supported independently of the loading apparatus.

4. Material handling apparatus including a main conveyor section, a loading apparatus movable laterally and longitudinally relative thereto, a floating conveyor section swiveled at one end on and detachably joined to the loading apparatus for receiving material therefrom, and means for supporting the other end of the floating conveyor to travel along and to swing laterally relative to the main section thereby to maintain the sections at all times in position to transfer material from one to the other.

5. Material handling apparatus including a main conveyor section, a carriage movable longitudinally thereof, a loading apparatus movable in different directions angularly and longitudinally independently of the main section, and a floating conveyor section pivotally connected to and coupling the loading apparatus and the carriage for lateral swinging movement relative thereto, said floating conveyor section being detachably connected to the loading apparatus and continually positioned for the transfer of material between the loading apparatus and the main conveyor section.

6. Material handling apparatus including a main conveyor section, a loading apparatus movable in different directions angularly and longitudinally relative to and independently of the main section, and a floating conveyor section swiveled and detachably connected at one end to the loading apparatus and slidable and swiveled at its other end on the main conveyor for bridging the space between the loading apparatus and the main conveyor section, thereby to provide an articulated conveyor for uninterrupted conveyance of material from the loading apparatus to the main conveyor section irrespective of the relative movements of the loading apparatus.

7. Material handling apparatus including parallel main conveyors relatively movable and positioned at all times for the transfer of material from one to the other, a loading apparatus movable in different directions angularly and longitudinally relative to and independently of the main conveyors, and a floating conveyor section swiveled and detachably connected at one end to the loading apparatus and slidable and swiveled at its other end relative to the main conveyors for bridging the space between the loading apparatus and the main conveyors, thereby to provide an articulated conveying apparatus for uninterrupted transfer of material from the loading apparatus to the main conveyors irrespective of the relative movements of the loading apparatus, said floating conveyor being supported at all times independently of the loading apparatus.

8. Material handling apparatus including parallel superposed conveyors in series positioned to transfers material from one to the other in succession, each conveyor of the series being entirely independent of the others in its actuation and movement in the direction of its length, a self propelled loading apparatus movable in different directions angularly and longitudinally independently of the superposed conveyors including a means for gathering material and means for elevating material, a movable support mounted to travel along and entirely independently of one of the series of superposed main conveyors in the direction of its length, a floating conveyor mounted swively at one end upon the movable support and a swiveled connection between the other end of the floating conveyor and the loading apparatus, said loading apparatus and conveyors cooperating to gather material and transport it from the point of loading at one end of the material handling apparatus to the point of discharge at the other end of said apparatus.

9. Material handling apparatus including an extensible articulated conveyor and a loading apparatus detachably and swively engaged by the conveyor.

10. Material handling apparatus including an extensible articulated conveyor and a loading apparatus detachably engaged by the conveyor, said apparatus being movably connected to and adapted to discharge upon the conveyor, and means for supporting all portions of the conveyor independently of the loading apparatus.

11. Material handling apparatus including an extensible articulated conveying apparatus formed of independently operable sections, a loading apparatus movable independently of the conveying apparatus, means for detachably and swively coupling one end of the conveying apparatus to the loading apparatus to receive material therefrom, and means for supporting the conveying apparatus independently of the loading apparatus.

12. Material handling apparatus including gathering and elevating apparatus, overlying conveyor sections mounted for independent longitudinal movement, a floating conveyor section pivotally joined to one of the overlying sections and movable longitudinally thereover, each section being positioned to deliver material onto the next adjoining section irrespective of their relative movements, and means for detachably and pivotally joining one end of the floating conveyor to the gathering and elevating apparatus.

13. Material handling apparatus including overlying independently supported main conveyors each mounted for longitudinal movement relative to the other, a carriage movable along and straddling one of the overlying main conveyors, a floating conveyor pivotally supported at one end by the carriage, and means for movably supporting the other end of the floating conveyor.

14. Material handling apparatus including overlying independently supported main conveyors each mounted for longitudinal movement relative to the other, a carriage movable along and straddling one of the overlying main conveyors, a floating conveyor pivotally supported at one end by the carriage, and means for movably supporting the other end of the floating conveyor, a loading apparatus movable independently of the conveyor, and means for detachably and pivotally joining the floating conveyor to the loading apparatus.

15. Material handling apparatus including a loading means for gathering and elevating material and a floating conveyor section mounted swively upon carriages at two points and detachably joined to the loading apparatus at one end to receive material therefrom.

ERNEST P. JAGGARD.